(12) United States Patent
Bredno et al.

(10) Patent No.: US 12,411,329 B2
(45) Date of Patent: Sep. 9, 2025

(54) AUTO-FOCUS METHODS AND SYSTEMS FOR MULTI-SPECTRAL IMAGING

(71) Applicant: Ventana Medical Systems, Inc., Tucson, AZ (US)

(72) Inventors: Joerg Bredno, San Francisco, CA (US); Jim F. Martin, Mountain View, CA (US); Anindya Sarkar, Milpitas, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 18/415,401

(22) Filed: Jan. 17, 2024

(65) Prior Publication Data

US 2024/0151958 A1 May 9, 2024

Related U.S. Application Data

(60) Continuation of application No. 17/900,127, filed on Aug. 31, 2022, now Pat. No. 11,914,130, which is a
(Continued)

(51) Int. Cl.
| | |
|---|---|
| G02B 21/24 | (2006.01) |
| G02B 21/00 | (2006.01) |
| G02B 21/16 | (2006.01) |
| G02B 21/36 | (2006.01) |
| G06T 7/80 | (2017.01) |

(Continued)

(52) U.S. Cl.
CPC ......... *G02B 21/244* (2013.01); *G02B 21/006* (2013.01); *G02B 21/0072* (2013.01); *G02B 21/008* (2013.01); *G02B 21/367* (2013.01); *G06T 7/80* (2017.01); *G06V 20/69* (2022.01); *H04N 23/10* (2023.01); *H04N 23/67* (2023.01); *G02B 21/16* (2013.01); *G06T 2207/10056* (2013.01)

(58) Field of Classification Search
CPC ............... G02B 21/244; G02B 21/006; G02B 21/0072; G02B 21/008; G02B 21/367; G02B 21/16; G06T 7/80; G06T 2207/10056; G06V 20/69; H04N 23/10; H04N 23/67
See application file for complete search history.

(56) References Cited

U.S. PATENT DOCUMENTS

| | | | |
|---|---|---|---|
| 2007/0242897 A1* | 10/2007 | Bushell | ..................... G06T 5/80 382/167 |
| 2010/0027856 A1* | 2/2010 | Olson | .................. G02B 21/365 382/128 |

(Continued)

*Primary Examiner* — Farzana Hossain
(74) *Attorney, Agent, or Firm* — Charney IP Law LLC; Thomas M. Finetti

(57) ABSTRACT

Techniques for acquiring focused images of a microscope slide are disclosed. During a calibration phase, a "base" focal plane is determined using non-synthetic and/or synthetic auto-focus techniques. Furthermore, offset planes are determined for color channels (or filter bands) and used to generate an auto-focus model. During subsequent scans, the auto-focus model can be used to quickly estimate the focal plane of interest for each color channel (or filter band) rather than re-employing the non-synthetic and/or synthetic auto-focus techniques.

14 Claims, 8 Drawing Sheets
(1 of 8 Drawing Sheet(s) Filed in Color)

Related U.S. Application Data division of application No. 16/931,319, filed on Jul. 16, 2020, now Pat. No. 11,467,390, which is a continuation of application No. 16/199,286, filed on Nov. 26, 2018, now Pat. No. 10,768,403, which is a continuation of application No. 14/901,700, filed as application No. PCT/EP2014/065064 on Jul. 15, 2014, now abandoned.

(60) Provisional application No. 61/847,978, filed on Jul. 18, 2013.

(51) Int. Cl.
*G06V 20/69* (2022.01)
*H04N 23/10* (2023.01)
*H04N 23/67* (2023.01)

(56) References Cited

U.S. PATENT DOCUMENTS

| | | | |
|---|---|---|---|
| 2010/0172020 A1* | 7/2010 | Price | G02B 21/244 |
| | | | 359/383 |
| 2012/0076390 A1* | 3/2012 | Potts | G06T 7/38 |
| | | | 382/133 |
| 2013/0100272 A1* | 4/2013 | Price | G02B 21/365 |
| | | | 348/E5.045 |

* cited by examiner

AUTO-FOCUS METHODS AND SYSTEMS FOR MULTI-SPECTRAL IMAGING

CROSS REFERENCE TO RELATED APPLICATIONS

The present application is a continuation of U.S. patent application Ser. No. 17/900,127 filed on Aug. 31, 2022, which application is a continuation of U.S. patent application Ser. No. 16/931,319 filed on Jul. 16, 2020, which application is a continuation of Ser. No. 16/199,286, filed on Nov. 26, 2018, which is a continuation of U.S. patent application Ser. No. 14/901,700, filed on Dec. 28, 2015, which is a U.S. National Phase application of PCT/EP2014/065064, filed Jul. 15, 2014, entitled "AUTO-FOCUS METHODS AND SYSTEMS FOR MULTI-SPECTRAL IMAGING" which claims the benefit under 35 U.S.C. § 119(e) of U.S. provisional patent application No. 61/847,978, filed Jul. 18, 2013, the disclosures of which are incorporated by reference herein in their entireties.

TECHNICAL FIELD

The technology disclosed herein relates to computer-based systems for imaging microscope slides and auto-focus techniques.

BACKGROUND

Digital pathology equipment is often used to produce digital images of microscope slides. Pathologists and histo-technologists often visually examine the digital images to obtain information about tissue samples and to identify the most appropriate treatment to improve a clinical outcome. To produce color images, automated slide scanners often acquire images in each of red, green, and blue color (RGB) channels and combine the images to produce a RGB image. Scanners also acquire a plurality of image channels with different spectral characteristics, like e.g. fluorescence imagers with a bench of multiple or tunable filters to acquire image data. In order to achieve suitable image data, automated slide scanning often includes automatically scanning a tissue sample at a large number of different Z-planes. Many of the captured images provide little or no value because the image data is often out of focus in most of the Z-planes. This problem also affects fluorescence imaging using a filter bench.

Additionally, the Z-plane for the best focus in the blue or green color channel may not be the Z-plane for the best focus in the red color channel, especially if the features being imaged are small (for example, less than 20 times the wavelength of light). Image blur in one color channel can impair the overall color image quality leading to serious problems with interpretation, diagnosis, and/or automated image analysis. To reduce blur, color slide scanners can acquire a complete Z-stack of images (e.g., a set of Z-stack of images for each color channel) and use complex auto-focus algorithms to create a single image from the Z-stacks. Unfortunately, this requires significant Z-stack acquisition time, memory to store a large amount of Z-stack data, and significant processing time to analyze the Z-stack data and to generate the color image. Alternatively, conventional color slide scanners can select a focus (or focal) plane for one channel and then scan other channels at the selected focus plane. For example, a focus plane can be selected for the best focus of the green channel. The slide scanner acquires images in the red and blue channels at that focus plane to produce a color or multi-spectral image. Unfortunately, the common focus plane used for all of the channels may not be the best focus plane for each channel, resulting in unwanted image blur in the composite image for features that are dominated by colors other than the one that dominated the focusing procedure.

Overview of the Technology

At least some embodiments of the disclosed technology are imaging systems that enhance the focus of composite images by capturing images at focal planes selected to improve the balance between optical sharpness, color separability and human readability. Each channel (e.g., a color channel) or filter band of a digital imager device can have a different focal plane. The "in focus" focal planes can be selected to capture a limited number of images (e.g., one image per channel or filter band) to produce a composite image that is most optimally focused for all color channels while limiting imaging times, data storage, or the like. The imaging system can produce, for example, highly-focused color images of a specimen by combining individual images in different color channels obtained at respective focal planes.

The focal plane or "in focus" Z-slice can correspond to captured images in a channel (or filter band) with the least amount of blur, sharpest image, etc. Each color channel (or filter band) is captured using an optimal focal plane or Z-slice for that color channel (or filter band) to limit or substantially reduce the amount of blur and/or distortion (e.g., chromatic aberration) observed in the composite image. The imaging systems can image one or more calibration microscope slides (e.g., phantom slides, tissue-specific training slides, etc.) indicative of, for example, tissue characteristics of tissue samples from patients. The imaging system can analyze the acquired images of the calibration slides to evaluate, for example, distortion, color aberration, or other unwanted problems. In some calibration processes, the impact of color aberration or distortion between a single auto-focus plane for all color channels and the best individual focal plane for each color channel is determined.

The imaging system can use model fitting techniques to process subsequent fields of views of the same tissue sample or different tissue samples. The model fit can be an offset or fitting technique involving, for example, polynomial fitting or other suitable fitting of a position of a specimen and a channel or band focal plan as variables. In some calibration processes, a Z-stack of images of one or more calibration slides can be obtained. The imaging system can determine the focal plane for each channel or filter band and compare that focal plane to a predicted focal plane from an auto-focus algorithm. This information is provided to the focus method applied when imaging an object like tissue, cells, etc. The information and, therefore, the auto-focus algorithm can be continuously or periodically updated based on the comparison to increase the accuracy of the auto-focus algorithm. In some embodiments, the auto-focus algorithm is updated based on a comparison of images at a predicted focal plane and an actual in-focus focal plane. The comparison of images in one channel can be used to select focal planes in other channels. Thus, two images in a single channel can be used to determine optimal focal planes in additional channels. Additionally, auto-focus algorithms of one channel can be adjusted based on an adjustment (e.g., focusing) of another channel. This can reduce overall processing time and enhance image quality.

In some embodiments, a multi-spectral computer-based system acquires focused color images of a microscope slide. In a calibration step, the system determines a Z-offset from a reference focus plane for one or more color channels of a color digital imager. The one or more reference focus planes can be, for example, the best focus plane individually selected for each color channel in a subset of color channels in the final image. In a scanning step, the system can determine a best focus plane for a field of view of the color digital imager. The color digital imager can obtain image data in the field of view in one or more of the red, green and blue color channels in accordance with the Z-offsets determined in the calibration step. Also, different routines can be performed to individually auto-focus each color channel, and methods to auto-focus can be selected based on an application and imaged tissue at hand.

In some embodiments, a method for acquiring focused images of a microscope slide can be performed using a microscope having an optical system and a digital color camera. The method includes characterizing chromatic aberration present in the optical system as a Z-offset from a best focus plane in each of the red, green and blue color channels of the digital color camera. The microscope slide can be imaged in a manner to reduce the effect of the characterized chromatic aberration by obtaining image data from the red, green and blue color channels in accordance with the Z-offsets. A multi-spectral system can include memory storing instructions that can be executed to automatically focus the optical system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
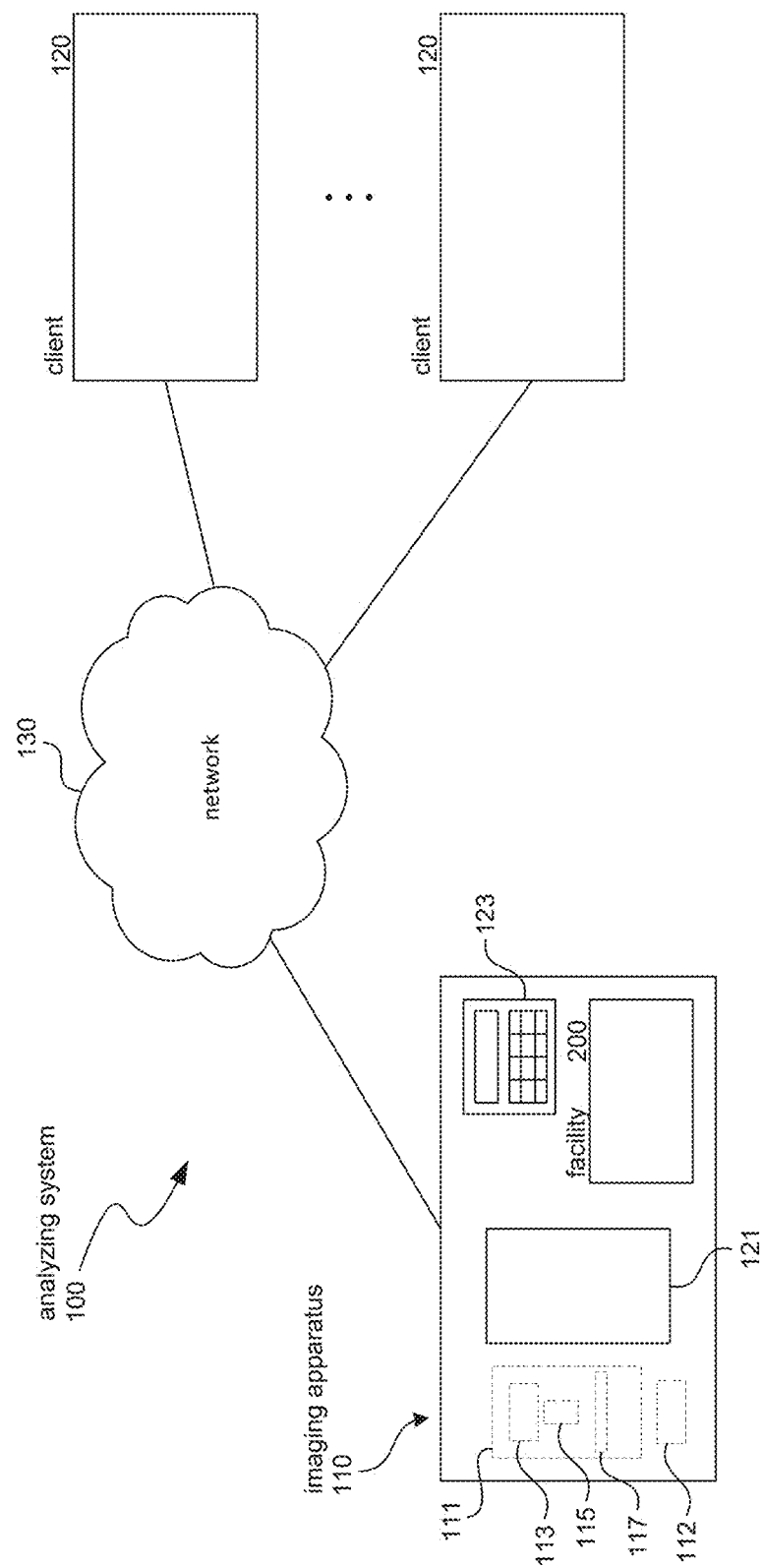
FIG. 1 illustrates a computer-based system and environment for performing auto-focus techniques in accordance with an embodiment of the disclosed technology.

At least some embodiments of the disclosed technology are imaging systems that include a facility configured to improve the "sharpness" of captured images by capturing images at different focal planes and/or Z-slices (e.g., Z-planes generated by a Z-stacking or focal plane merging process) for different color channels or filter bands. For each color channel or filter band, the facility identifies the focal plane or Z-slice having the least amount of blur (i.e., the focal plane or Z-slice that is "most in focus") and uses these focal planes or Z-slices, for example, to capture focused images. The focused images can be combined to produce a focused composite image. For example, a focused red channel image, a focused green channel image, and a focused blue channel image can be combined to produce a focused color image. Because the facility uses an optimal focal plane or Z-slice for each color channel (or filter band), the amount of chromatic aberration observed in the final composite image can be reduced.

It should be noted that although it is typical for those skilled in the art of microscopy and digital imaging to speak of the "sharpness" of the image or the sharpness of the focus, we would like to emphasize in this patent that the "best focus" is not necessarily the "sharpest". Often it is better to optimize color separability or human readability in some combination with optical or focal sharpness. Therefore, by "sharper" and "sharpest", the inventors mean "more optimal" or "optimum" in the sense of balancing optical sharpness, color separability and human readability. "Human readability" is included because often the image is easier to interpret if some of the fine structure (tissue structure that is irrelevant to the diagnosis) of the specimen is not so evident and this can be included in the model that is identified in the patent.

The techniques described herein can be used to enhance known auto-focus and Z-slicing techniques, such as passive or active auto-focus techniques including, but not limited to, phase detection auto-focus techniques, contrast detection auto-focus techniques, and so on. Additional auto-focus, Z-slicing, and slide imaging techniques are described by Bradley and Bamform in "A One-pass Extended Depth of Field Algorithm Based on the Over-complete Discrete Wavelet Transform"; Image and Vision Computing '04 New Zealand (IVCNZ'04), Akaroa, New Zealand, pp. 279-284 (November 2004); U.S. Non-Provisional patent application Ser. No. 13/697,681, filed May 4, 2011, entitled "Autofocus Imaging"; U.S. Provisional App. No. 61/367,341, filed Jul. 23, 2010, entitled "On-the-Fly Focusing Sensor"; U.S. Provisional App. No. 61/299,231, filed Jan. 28, 2010, entitled "Slide Caching in a Slide Scanning Microscope"; U.S. Provisional Application No. 61/261,251, filed Nov. 13, 2009, entitled "Scanning Microscope Slide Stage"; U.S. Provisional App. No. 61/256,228, filed Oct. 29, 2009, entitled "High Speed Slide Scanning System for Digital Pathology"; U.S. Provisional App. No. 61/252,995, filed Oct. 19, 2009, entitled "On-the-Fly Focusing Systems and Techniques for Scanning Microscopes"; and U.S. Pat. No. 7,200,252, filed Oct. 28, 2012, entitled "Color Space Transformations for Use in Identifying Objects of Interest in Biological Specimens".

In some embodiments, the facility generates an auto-focus model during a calibration phase or step and uses the generated auto-focus model during subsequent scans of slides and/or field of view scans to reduce scan time and data size while providing improved focus for each individual color channel (or filter band). During the calibration step, the facility determines a "base" auto-focus plane or Z-slice for one image and then determines auto-focus plane "offsets" for various color channels (or filter bands). The calibration step includes analyzing one or more "phantom" or "training slides" that are representative of specimens (e.g., bacteria, biological material, and so on), tissue (e.g., breast tissue, tumor tissue, and so on), or other specimens to be scanned. A "base" value is determined by applying an auto-focus technique to the training slide(s) by analyzing images of the slide(s) captured at different focal planes. One of ordinary skill in the art will recognize that many different auto-focus algorithms may be employed, including those mentioned above and other auto-focus techniques. The "base" value, in some embodiments, is generated using gray scale version of the slide(s). In other embodiments, the "base" value is generated using a single color channel, a combination of color channels (e.g., a combination of color channels which may be dominated by a single color channel such as green), a single filter band, luminosity values, and so on. The calibration step can further include determining an "offset" value in Z for each color channel (or filter band) corresponding to the focal plane offering the highest degree of sharpness for the color channel (or filter band). The facility can determine each "offset" value by applying an auto-focus technique to a first slide by analyzing color channel or filter band-specific images of the slide(s) captured at different focal planes (or different Z-slices) to identify the sharpest focal plane (or Z-slice). Each "offset" value can be calculated as a difference from the "base value." For example, if the "base" value is at a Z of 23 µm (micrometers) and the sharpest focal plane for a red color channel is at a Z of 24 µm, then the red color channel offset is +1 µm. As another example, if the "base" value is 25 µm and the sharpest focal plane for a red color channel is 24 µm, then the red color channel offset is −1 µm. As another example, if a "base" Z-slice has an index of 7 and sharpest Z-slice for a red color channel has an index of 9, then the red color channel offset is +2. In some embodiments, the base value may correspond to measure of the lens relative to its overall range of movement. For example, if the lens has an overall range of movement of 50 µm, the base value may represent a measure between 0 µm and 50 µm along the overall range of movement. When multiple training slides are used, the resulting base and offset values can be combined into a single composite model by, for example, computing the average base and offset values for each slide position/color channel (or filter band), using the most common base and offset values, or other suitable aggregation techniques.

In some embodiments, the facility divides slide data into a grid (e.g., 1×1, 3×3, 9×9, 12×24, 100×1000, etc.) and performs the calibration step for each section of the grid. For example, if the facility divides slide data into a 3×3 grid, the facility generates one "base" value for each of the 9 sections and generates one offset value for each color channel or filter band for each of the 9 sections. In this manner, the model can be optimized for each section of the grid. The "base" values may be calculated using, for example, a gray scale version of the captured image data, luminosity values for the captured image data, a single color channel of the captured image data (e.g., red, green, blue), a particular filter band, and so on.

In some embodiments, the facility creates calibration data by invoking an existing auto-focus algorithm during a calibration phase with, for example, a suitable phantom slide or set of tissue-specific training slides (i.e., calibration slides) reflective of the tissue structural variability for the independent color channels (or filter bands). The facility may also invoke an existing single-channel auto-focus method and compare the results to the enhanced auto-focus method to determine the impact of chromatic aberration as differences between single-plane auto-focus and each individual best focus plane. A model fit (e.g., an offset or polynomial fitting using the slide position and color channel (or filter band) as variables) can be employed while scanning slides after calibration.

In certain embodiments, the facility creates calibration data from a Z-slice scan of a suitable phantom slide and determines the Z-slice with best focus individually for each color channel (or filter band) and compares this to the result of the auto-focus algorithm applied to the same slide to generate an offset value that can be applied to subsequently scanned slides. In some embodiments, the facility applies this calibration technique to the subsequently-scanned slides and compares the calibration information to previously-generated models to determine whether the models need to be updated.

At least one of the color channels can be acquired at the "base" auto-focus plane or Z-slice determined for the slide without an offset. Therefore, at least one color channel is imaged at the standard focus plane and with the focus plane modified by applying an offset as discussed above. For each color channel, a focus sharpness metric can be computed for the two focal planes or Z-slices acquired and the optimal plane (i.e., sharpest) can be selected for output. Appropriate focus sharpness optimization metrics can be based on some computation derived from or related to the gradient of image intensity in the x-direction and y-direction of an image. In one embodiment, the computation of such a metric can be performed by translating the image a few pixels in x-direction and/or y-direction and summing the absolute differences. More complex focus optimized metric algorithms (including, for example, application-specific measures of focus sharpness) are frequently used to enhance the contribution to this computation from one type of feature (such as dots, corners, lines, ridges, plateaus or other shapes common to the images under consideration) over others. A review of focus sharpness (traditional "sharpness") metrics can be found in S. Pertuz, D. Puig, M. Angel Garcia, "Analysis of focus measure operators for shape-from-focus," Pattern Recognition, Volume 46, Issue 5, May 2013, Pages 1415-1432, where they are referred to as "focus measure operators". Another method for computing a generalized focus sharpness metric is to carry out a median filter operation or other type of image smoothing on a monochrome image representing one color channel of the image or a combination of the color channels available in the image. After such a filter, the smoothed image can be subtracted or otherwise combined with the original to yield a scalar, vector or matrix that with higher absolute values when the image is in focus and lower absolute values when it is out of focus. Summing the absolute difference of the two images is one example of such a combining method. Extending this, the median filter can be carried out in parallel multiple times, increasing the local application of the filter from 3×3 pixels to 5×5 pixels to 7×7 pixels, etc. The values corresponding to the maxima (or any other measure of intensity) in the resulting images, sometimes including the original, can be fit to a straight line or combined in some other way that characterizes the sequence of values. For an image that is in sharp focus, the slope of such a line is greater than the slope for an image that is not in sharp focus. Thus, with the scan acquisition process, no more than two images are acquired for an imaged slide while focus performance will show no loss over standard auto-focus techniques. This additional automatic quality assurance technique can be used, for example, when experiments indicate a risk for image quality degradation for some of the modified acquisitions. In some embodiments, the facility automatically updates the model parameters for the correction of chromatic aberration of the auto-focus algorithm if the above-mentioned automatic quality assurance technique fails. A robust update scheme (e.g., a weighted match of previous and current observation or the search of an optimal setting for the last N Z-slice scans) can be employed, if needed or desired.

FIG. 1 illustrates a computer-based system and environment for analyzing tissue specimens in accordance with an embodiment of the disclosed technology. An analyzing system 100 includes an imaging apparatus 110 and client computer systems 120. Specimen-bearing microscope slides can be loaded into the imaging apparatus 110. The imaging apparatus 110 can perform auto-focus techniques and produce images of the specimens in multiple color channels. In some embodiments, the imaging apparatus includes a microscope for bright field and/or fluorescent imaging of the specimen-bearing microscope slides. The imaging apparatus 110 may further be a whole-slide scanner. One example whole-slide scanner is the VENTANA iScan HT product of the assignee Ventana Medical Systems, Inc. (Tucson, AZ). The images can be sent to the client computer systems 120 either through a direct connection (not shown) or via a network 130. The client computer systems 120 display images to users, such as pathologists, histotechnologists, or the like.

The imaging apparatus 110 can include, without limitation, one or more image capture devices 111 and facilities 200. Internal components of the imaging apparatus 110 are shown in phantom line. Image capture devices 111 can include, without limitation, a digital imager 113 (e.g., a digital camera) with an optical system (e.g., one or more lenses 115, sensor focus lens groups, microscope objectives, etc.), imaging sensors (e.g., a charge-coupled device (CCD), a complimentary metal-oxide semiconductor (CMOS) image sensor, or the like), or the like. In digital embodiments, the digital imager 113 can include a plurality of lenses that cooperate to provide focusing (e.g., auto-focusing). A CCD sensor can capture a digital image of specimen slide 117. In some embodiments, the digital imager 113 has red, green and blue color channels for producing color images and is operable to capture images at different focal planes or Z-slices. In other embodiments, the digital imager 113 is a monochromatic or color sensor, the optical system includes multiple and/or tunable filters, and multispectral or color image channels are created by acquiring multiple images from imager 113 with different filters and/or filter settings. One method of producing a color image includes determining one or more scan areas comprising a region or slide position of the microscope slide that includes at least a portion of the specimen. The scan area may be divided into a plurality of snapshots. An image can be produced by combining the snapshots. The combined image of the whole specimen or slide can have snapshots with images in the RGB channels at the same or different focal planes. The imaging apparatus 110 can also include an access door 121 and a controller 123. Slide can be loaded into the imaging apparatus 110 via the access door 121, and the controller 123 can be used to control operation of the imaging apparatus 110.

The imaging apparatus 110 and client computer systems 120 can include a desktop computer, a laptop computer, a tablet, or the like and can include digital electronic circuitry, firmware, hardware, memory, a computer storage medium, a computer program, a processor (including a programmed processor), or the like and can store digital images in binary form. The images can also be divided into a matrix of pixels. The pixels can include of a digital value of one or more bits, defined by the bit depth. The digital value may represent, for example, energy, brightness, color, intensity, density, elevation, or a classified value derived through image processing. Non-limiting exemplary digital image formats include, but are not limited to, bit-mapped, joint pictures expert group (JPEG), tagged image file format (TIFF), and graphics interchange format (GIF), as well as other digital data formats.

The network 130 or a direct connection interconnects the imaging apparatus 110 and the client computer systems 120. The network 130 may include, without limitation, one or more gateways, routers, bridges, combinations thereof, or the like. The network 130 may include one or more servers and one or more websites that are accessible to users and can be used to send and receive information that the client computer systems 120 can utilize. A server may include, without limitation, one or more associated databases for storing information (e.g., digital images, algorithms, staining protocols, or the like). The network 130 can include, but is not limited to, data networks using the Transmission Control Protocol (TCP), User Datagram Protocol (UDP), Internet Protocol (IP) and other data protocols. The client computer systems 120 can perform the methods and techniques discussed herein. Components and features of the client computer system 120 can be mixed and matched with other components and features of the disclosed technology.

Figure 2:
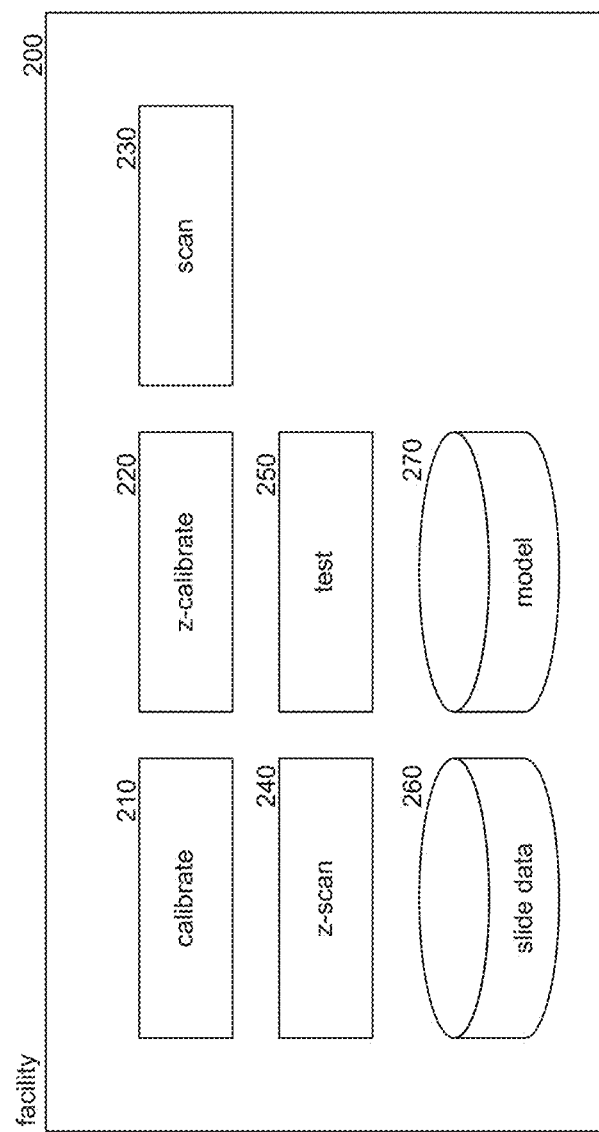
FIG. 2 is a block diagram illustrating a facility for enhancing auto-focus routines in accordance with an embodiment of the disclosed technology.

FIG. 2 is a block diagram illustrating a facility 200 for enhancing auto-focus routines in some embodiments. The facility 200 comprises calibrate component 210, Z-calibrate component 220, scan components 230, 240, test component 250, slide data store 260, and model store 270. The facility can selectively invoke the calibrate component 210, Z-calibrate component 220, scan components 230, 240, and/or test component 250. The calibrate component 210 calibrates and generates a focal plane-based auto-focus model that can be applied to subsequently scanned slides. The Z-calibrate component 220 calibrates and generates a Z-slice-based auto-focus model that can be applied to subsequently scanned slides. The scan component 230 can scan and generate images using a focal plane-based auto-focus model generated by the calibrate component 210. The Z-scan component 240 can scan and generate images using a Z-slice-based auto-focus model generated by the Z-calibrate component 210. The test component 250 determines whether a previously-generated model needs to be updated and, if so, updates the model. Slide data store 260 stores captured slide data (e.g., images, such as Z-slices, metadata, and so on). Model store 270 stores model information, such as base values and offset values for different slide positions and different slide data types. For example, the model store 270 may include different models for different types of tissue or other imaged data.

Figure 3:
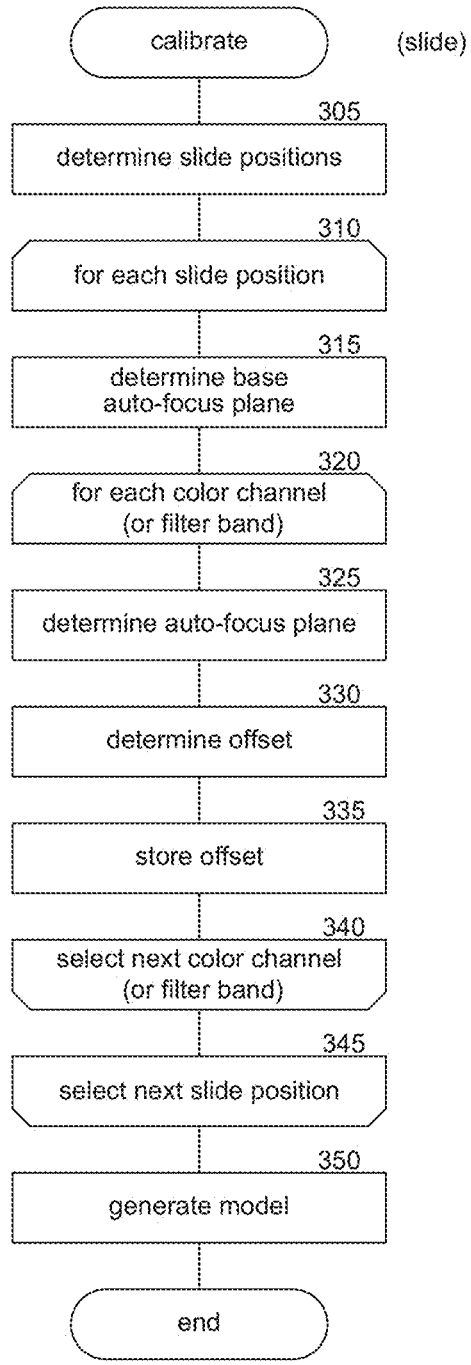
FIG. 3 is a flow diagram illustrating processing of a calibrate component in accordance with an embodiment of the disclosed technology.

FIG. 3 is a flow diagram illustrating the processing of the calibrate component 210 of FIG. 2 in accordance with some embodiments. The calibrate component 210 may be invoked for a single training slide or a series of training slides to generate an auto-focus model. In block 305, the component determines a slide position or positions for the slide. For example, if the component is configured to generate values for a particular grid configuration, the component identifies the area or areas of the slide corresponding to sections of the grid. In some embodiments, the component may prompt a user to identify the slide positions.

In blocks 310-345, the component loops through each of the determined slide positions to generate base and offset values for each slide position. In block 315, the component invokes an auto-focus technique to identify an in-focus focal "base" plane for the current slide and stores an indication of the focal plane (e.g., a distance from the lens or other portion of the imaging apparatus to the focal plane) and slide position. In some embodiments, the base plane may be determined by analyzing gray scale images of the slide. In other embodiments, the base plane may be determined by analyzing a particular color channel (or filter band). In blocks 320-340, the component loops through each color channel (or filter band) to determine an offset value for each color channel (or filter band). In block 325, the component invokes an auto-focus technique to identify an in-focus focal plane for the currently selected color channel (or filter band) and slide position. For example, the in-focus plane can be determined based on a distance from the lens or other portion of the imaging apparatus to the focal plane. In block 330, an offset for the currently selected color channel (or filter band) is determined based on the distance between the focal planes identified in blocks 325 and 315. In block 335, the component stores the determined offset. In block 340, the next color channel (or filter band), if any, is selected and the component then loops back to process the next color channel (or filter band). In block 345, the component selects the next slide position, if any, and then loops back to process the next slide position.

In block 350, an auto-focus model is generated using the base and offset values determined for each slide position. The auto-focus model stores, for example, an indication of the number and location of slide positions, an indication of the type of material scanned (e.g., breast tissue, bacteria, etc.), a base value for each slide position corresponding to the base focal plane and, for each color channel or filter band, one offset value for each slide position. Table 1 provides an example of the type of data that may be stored in a model generated for tissue using a 3×3 grid layout.

TABLE 1

Breast Tissue (3 × 3)

| | | |
|---|---|---|
| $\text{offset}_{red}$ = −2.0 μm | $\text{offset}_{red}$ = 1.2 μm | $\text{offset}_{red}$ = 2.4 μm |
| $\text{offset}_{green}$ = −1.7 μm | $\text{offset}_{green}$ = 2.1 μm | $\text{offset}_{green}$ = −1.2 μm |
| $\text{offset}_{blue}$ = 0.4 μm | $\text{offset}_{blue}$ = −0.7 μm | $\text{offset}_{blue}$ = 1.1 μm |
| $\text{offset}_{red}$ = −3.0 μm | $\text{offset}_{red}$ = 2.0 μm | $\text{offset}_{red}$ = −1.9 μm |
| $\text{offset}_{green}$ = 1.0 μm | $\text{offset}_{green}$ = −1.3 μm | $\text{offset}_{green}$ = 2.0 μm |
| $\text{offset}_{blue}$ = 0.6 μm | $\text{offset}_{blue}$ = −1.1 μm | $\text{offset}_{blue}$ = −1.1 μm |
| $\text{offset}_{red}$ = 0.9 μm | $\text{offset}_{red}$ = −0.3 μm | $\text{offset}_{red}$ = 0.8 μm |
| $\text{offset}_{green}$ = 1.2 μm | $\text{offset}_{green}$ = 1.0 μm | $\text{offset}_{green}$ = −2.4 μm |
| $\text{offset}_{blue}$ = −1.9 μm | $\text{offset}_{blue}$ = −1.1 μm | $\text{offset}_{blue}$ = −3.0 μm |

In this example, the model includes nine red channel offsets ($\text{offset}_{red}$), nine green channel offsets ($\text{offset}_{green}$), and nine blue channel offsets ($\text{offset}_{blue}$), one of each for each slide position. In some embodiments, the model may also store an indication of the type of images that were used to determine the base focal plane (e.g., grayscale image, a particular filter band, a particular color channel). Although the data stored in Table 1 is shown in a format that is readily interpreted by a human, one skilled in the art will recognize that the data may be stored in any manner or data structure.

Figure 4:
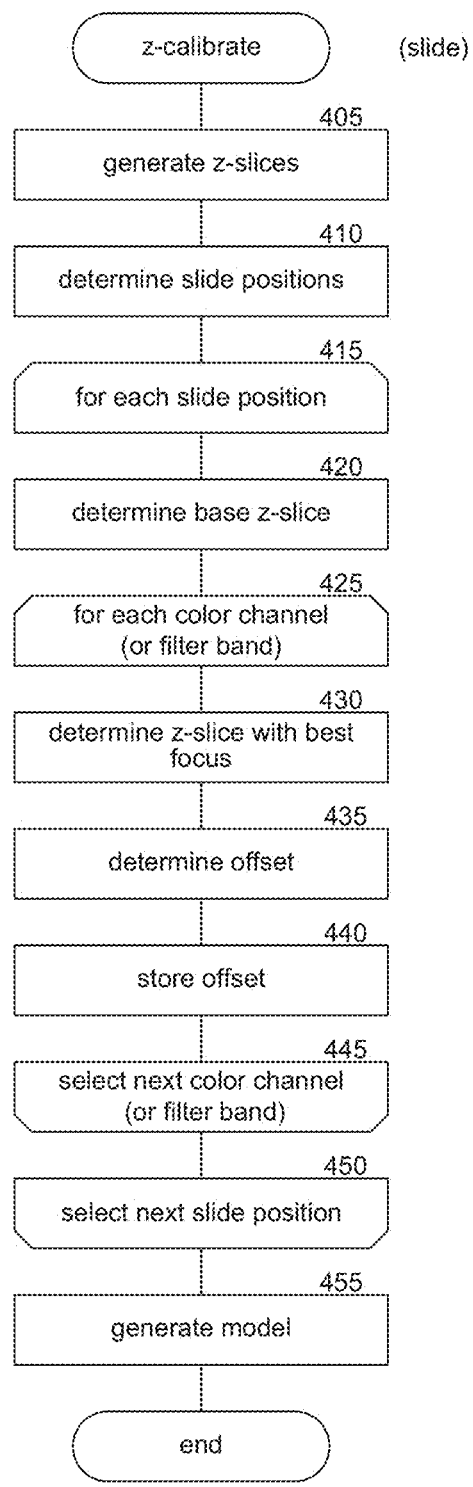
FIG. 4 is a flow diagram illustrating processing of a Z-calibrate component in accordance with an embodiment of the disclosed technology.

FIG. 4 is a flowchart illustrating the processing of a Z-calibrate component 220 to calibrate and generate a Z-slice-based auto-focus model, in accordance with some embodiments. The component 220 may be invoked by the facility 200 for a single training slide or a series of training slides to generate an auto-focus model. In block 405, the component generates Z-slices for the slide using any focus stacking technique. In some embodiments, the component may retrieve stored Z-slices generated from previously captured slide data. In this manner, the disclosed techniques can be used to enhance the auto-focus of previously-captured slides. In block 410, a slide position or positions for the slide can be determined. For example, if the component is configured to generate values for a particular grid configuration, the component identifies the areas of the slide corresponding to sections of the grid. In some embodiments, a user is prompted to identify the slide positions. In blocks 415-450, the component loops through each of the determined slide positions to generate base and offset values for each slide position. In block 420, Z-slices are analyzed to identify the Z-slice having the sharpest image by, for example, using known focus stacking techniques. In some embodiments, the base Z-slice may be determined by analyzing gray scale version of each Z-slice. In other embodiments, the base Z-slice may be determined by analyzing a particular color channel or filter band. In blocks 425-445, the component loops through each color channel (or filter band) to determine an offset value for each color channel (or filter band). In block 430, the Z-slice having the sharpest image for the current color channel is identified. In block 435, an offset for the currently selected color channel (or filter band) is determined based on the difference between the Z-slices identified in blocks 420 and 430. In block 440, the component stores the determined offset. In block 445, the next color channel (or filter band), if any, is selected and the component then loops back to process the next color channel (or filter band). In block 450, the component selects the next slide position, if any, and then loops back to process the next slide position. In block 455, an auto-focus model is generated using the base and offset values determined for each slide position. The auto-focus model stores, for example, an indication of the number and location of slide positions, an indication of the type of material scanned (e.g., breast tissue, bacteria), a base value for each slide position corresponding to the base Z-slice and, for each color channel or filter band, one offset value for each slide position. Table 2 provides an example of the type of data that may be stored in a model generated for tissue using a 3×3 grid layout.

TABLE 2

Breast Tissue (33 × 33) − Z-slices = {0 . . . 15}

| | | |
|---|---|---|
| $\text{offset}_{red}$ = 1 | $\text{offset}_{red}$ = 5 | $\text{offset}_{red}$ = −1 |
| $\text{offset}_{green}$ = −3 | $\text{offset}_{green}$ = −3 | $\text{offset}_{green}$ = 0 |
| $\text{offset}_{blue}$ = 4 | $\text{offset}_{blue}$ = 3 | $\text{offset}_{blue}$ = 1 |
| $\text{offset}_{red}$ = −3 | $\text{offset}_{red}$ = 2 | $\text{offset}_{red}$ = 0 |
| $\text{offset}_{green}$ = 3 | $\text{offset}_{green}$ = −4 | $\text{offset}_{green}$ = −2 |
| $\text{offset}_{blue}$ = −2 | $\text{offset}_{blue}$ = 4 | $\text{offset}_{blue}$ = 0 |
| $\text{offset}_{red}$ = −4 | $\text{offset}_{red}$ = 3 | $\text{offset}_{red}$ = −1 |
| $\text{offset}_{green}$ = 1 | $\text{offset}_{green}$ = 2 | $\text{offset}_{green}$ = 2 |
| $\text{offset}_{blue}$ = −3 | $\text{offset}_{blue}$ = −3 | $\text{offset}_{blue}$ = −2 |

In this example, 16 Z-slices were generated and each Z-slices is identified by an index from 0 to 15. Furthermore, the model includes nine red channel offsets ($\text{offset}_{red}$), nine green channel offsets ($\text{offset}_{green}$), and nine blue channel offsets ($\text{offset}_{blue}$), one of each for each slide position. In some embodiments, the model may also store an indication of the type of images that were used to determine the base focal plane (e.g., grayscale image, a particular filter band, a particular color channel). Although the data stored in Table 2 is shown in a format that is readily interpreted by a human, one skilled in the art will recognize that the data may be stored in any manner or data structure.

Figure 5:
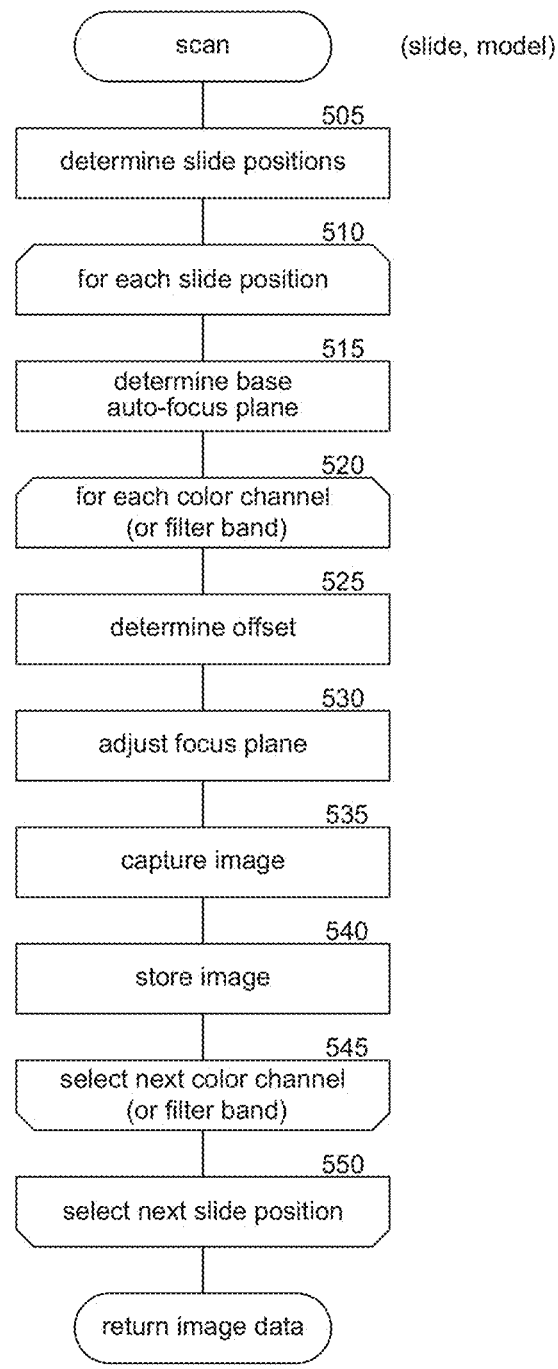
FIG. 5 is a flow diagram illustrating processing of a scan component in accordance with an embodiment of the disclosed technology.

FIG. 5 is a flow diagram illustrating the processing of the scan component 230 of FIG. 2 for capturing images of a slide based on the auto-focus model, in accordance with some embodiments. In block 505, the component determines slide positions based on the model. Using the model of Table 1 as an example, the component may identify the portions of the slide corresponding to each position in the 3×3 grid by splitting the slide into 9 portions corresponding to the 3×3 grid. In some embodiments, the model may include additional information about the location of each portion if, for example, the portions are not the same size, which the scan component may use to determine the slide positions. In blocks 510-550, the component loops through each of the determined slide positions to capture one or more images for each slide position. In block 515, auto-focus technique is used to identify an in-focus focal "base" plane for the current slide. The base plane is identified by analyzing images generated in the same manner that the images used to identify the base planes in the model were generated. For example, if the base planes in the model were identified by analyzing gray scale images, then the scan component analyzes gray scale images of the current slide to determine the base plane for the current slide. In blocks 520-545, the component loops through each of the color channels (or filter bands) to capture a corresponding image for each. In block 525, the offset for the current color channel (or filter band) stored by the model is determined. In block 530, the component adjusts the focal plane based on the "base" plane determined in block 515 and the offset. For example, if the determined "base" plane is at 3.2 μm and the offset is −1.1 μm, then the component will adjust the focal plane to 2.1 μm. In block 535, the component captures an image of the slide using the adjusted focal plane and the current color channel (or filter band). In block 540, the captured image is stored. In block 545, the next color channel (or filter band), if any, is selected and the component then loops back to process the next color channel (or filter band). In block 550, the component selects the next slide position, if any, and then loops back to process the next slide position. The component then returns the captured image data for further processing and analysis.

Figure 6:
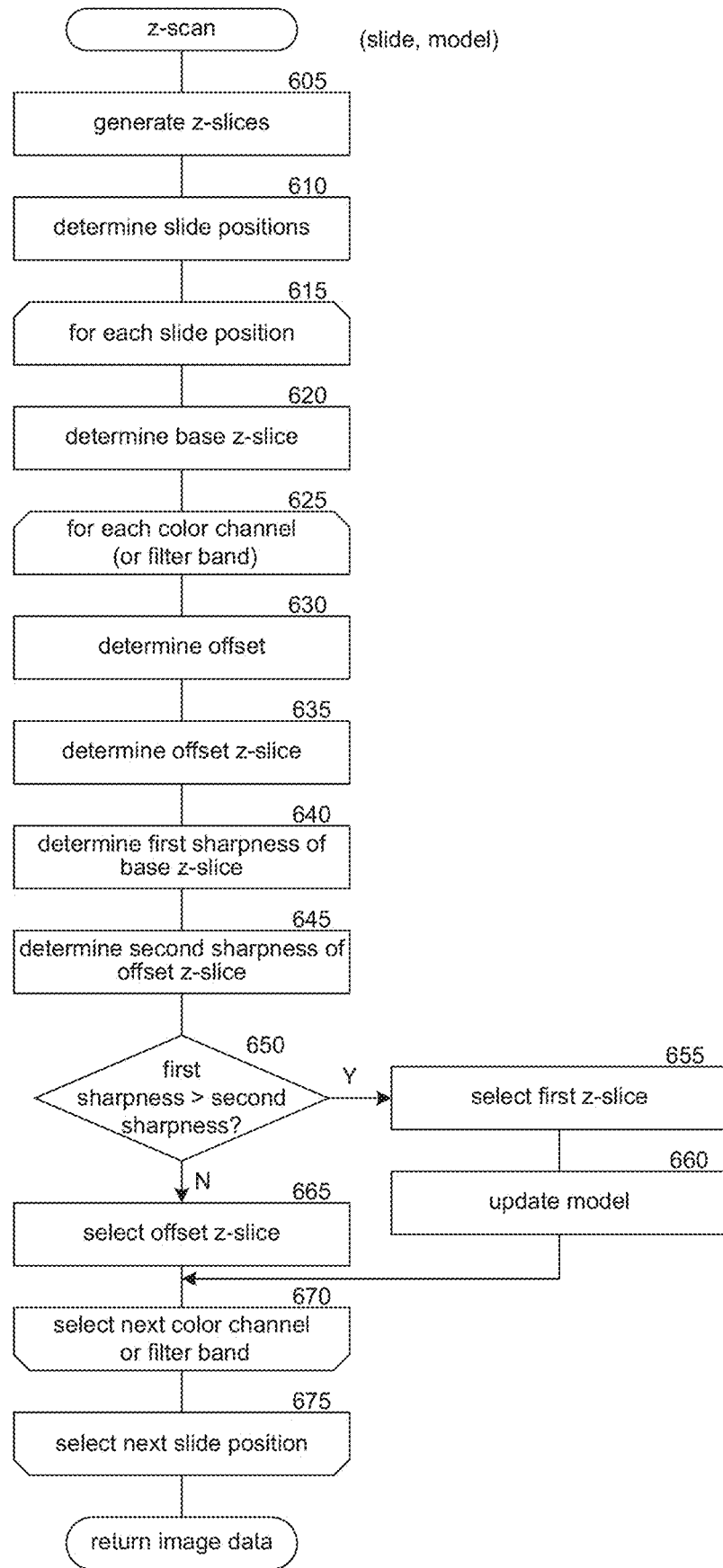
FIG. 6 is a flow diagram illustrating processing of a Z-scan component in accordance with an embodiment of the disclosed technology.

FIG. 6 is a flow diagram illustrating the processing of the Z-scan component 240 for generating images for a slide based on a previously generated auto-focus model, such as the auto-focus model generated by the Z-calibrate. In block 605, the component generates Z-slices for the current slide. In block 610, slide positions are determined based on the model. Using the model of Table 2 as an example, the component may identify the portions of the slide corresponding to each position in the 3×3 grid by splitting the slide into 9 portions corresponding to the 3×3 grid. In some embodiments, the model may include additional information about the location of each portion if, for example, the portions are not the same size, which the Z-scan component may use to determine the slide positions. In blocks 615-675, the component loops through each of the determined slide positions to capture one or more images for each slide position. In block 620, the generated Z-slices are analyzed to identify the Z-slice having the sharpest image. The base Z-slice is identified by analyzing images generated in the same manner that the images used to identify the base Z-slices in the model were generated. For example, if the base Z-slices in the model were identified by analyzing gray scale images, then the Z-scan component analyzes gray scale images of the current slide to determine the base Z-slice for the current slide. As another example, if the base Z-slices in the model were identified by analyzing red channel images, then the Z-scan component analyzes red channel images of the current slide to determine the base Z-slice for the current slide. In blocks 625-670, the component loops through each of the color channels (or filter bands) to capture a corresponding image for each. In block 630, the component determines the offset for the current color channel (or filter band) stored by the model. In block 635, the component determines the offset Z-slice based on the base Z-slice determined in block 620 and the determined offset. For example, if the determined "base" Z-slice has an index of 7 and the offset is −2, then the component will identify the Z-slice corresponding to an index of 5. In block 640, the component determines a sharpness of the base Z-slice using a focus sharpness measure, such as the sum of absolute differences between an image and the same image shifted (e.g., shifted a few pixels in one direction), the sum of absolute differences between an image and the result of filtering the imaging with a smoothing operation, a focus sharpness measure extracted after filtering the image with a multitude of smoothing operations at different filter scales, or any combination thereof. In block 645, the component determines a sharpness of the offset Z-slice. In decision block 650, if the sharpness of the base Z-slice is greater than the sharpness of the offset Z-slice, then the component continues at block 655, else the component continues at block 665. In block 655, the base Z-slice is selected as the image data for the current slide position and color channel (or filter band). In this manner, if the sharpness of the offset Z-slice is less than the sharpness of the base Z-slice, then the sharper Z-slice will be selected. In block 660, the component optionally updates the model to adjust the offset for the current slide position and color channel (or filter band). For example, each time a particular model is used to analyze slides, the component may record the index of the Z-slice that is selected for each slide position and color channel (or filter band) pair and use this information to calculate an average when updating the model. For example, an average (e.g., weighted average) of the previous 5, 10, 15, or 100 Z-slice indices can be used to update the model. In block 665, the component selects the offset Z-slice as the image data for the current slide position and color channel (or filter band). In block 670, the next color channel (or filter band), if any, is selected, and the component then loops back to process the next color channel (or filter band). In block 675, the next slide position, if any, is selected, and the component then loops back to process the next slide position. The component then returns the selected image data for further processing and analysis.

Figure 7:
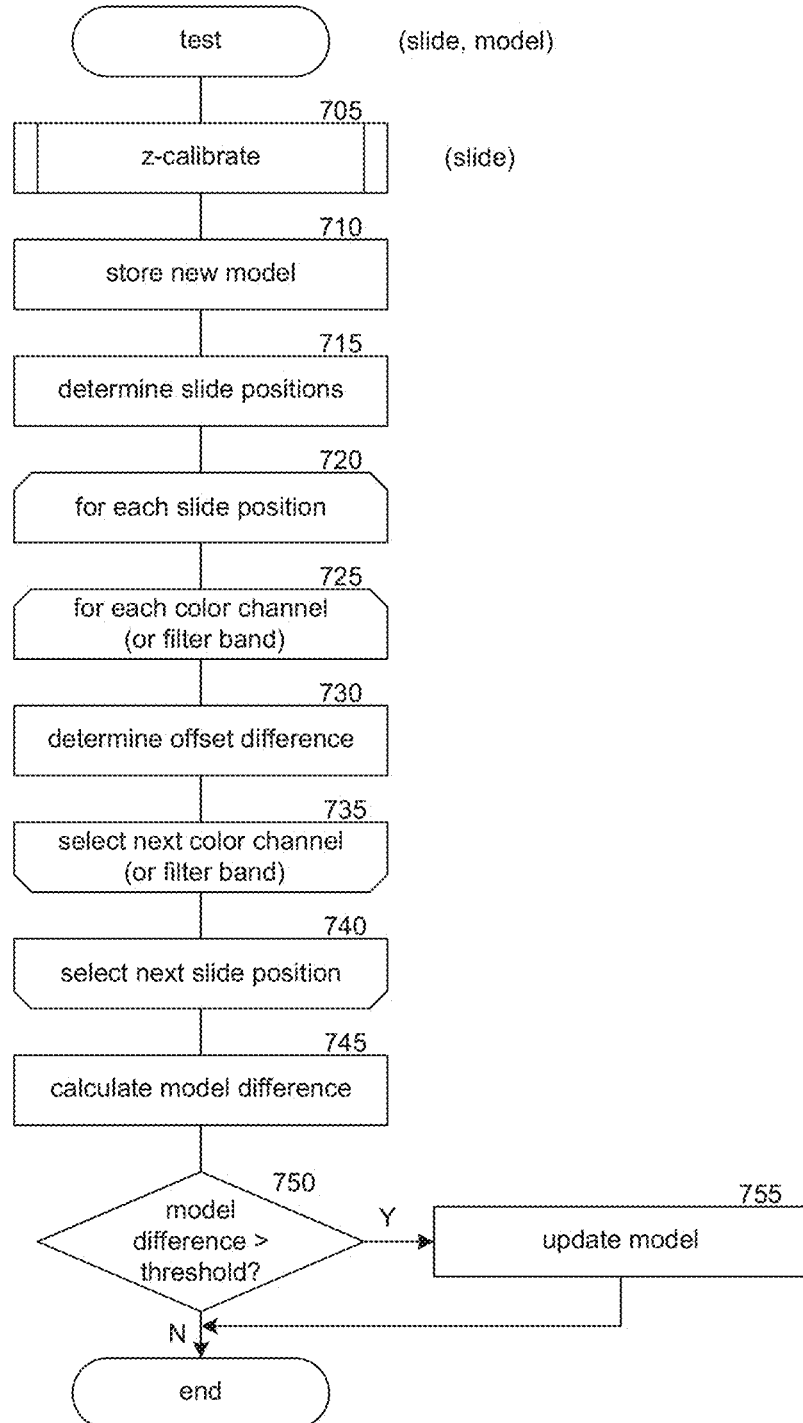
FIG. 7 is a block diagram illustrating processing of a test component in accordance with an embodiment of the disclosed technology.
Figure 8A:
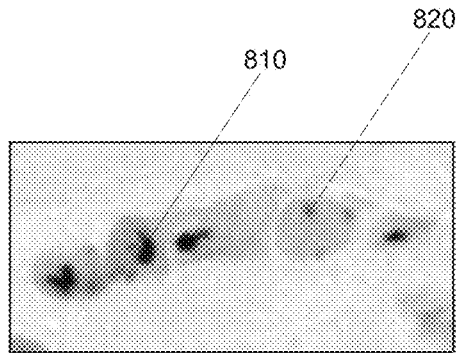
FIGS. 8A-8E are display images at various Z-slices or focal planes generated for a particular slide in accordance with an embodiment of the disclosed technology.
Figure 8B:
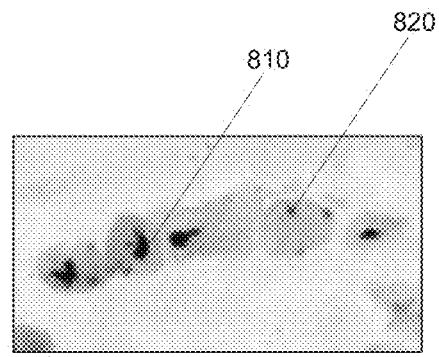
Figure 8C:
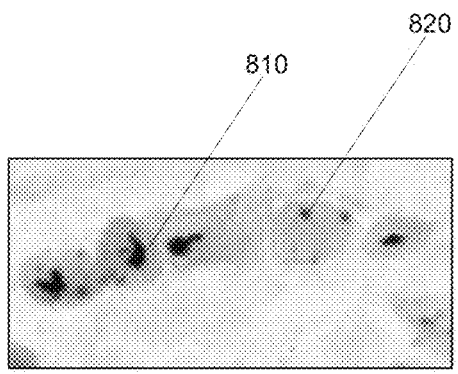
Figure 8D:
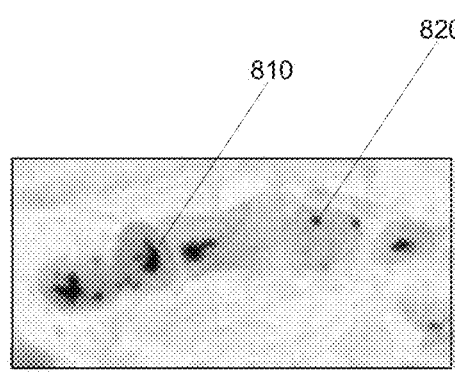
Figure 8E:
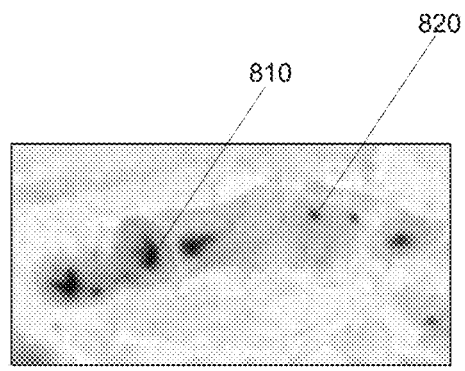

FIG. 7 is a block diagram illustrating the processing of a test component 250 for determining whether a previously-generated model needs to be updated and, if so, updates the model, in accordance with some embodiments. In block 705, the component invokes the Z-calibrate component to generate a new model based on a received slide. In block 710, the component stores the new model. In block 715, slide positions are determined by the component. In blocks 720-740, the component loops through each slide position to determine offset differences between the new model and the previously-generated model. In blocks 725-735, the component loops through each color channel (or filter band). In block 730, the difference between the offset for the current position and color channel (or filter band) in the new model are determined, and the component determines an offset for the current position and color channel (or filter band) in the previously-generated model. In block 735, the component selects the next color channel (or filter band), if any, and then loops back to process the next color channel (or filter band). In block 740, the next slide position, if any, is selected, and the component then loops back to process the next slide position. In block 745, the component calculates a model difference value corresponding to the distance between the two models. For example, a difference value is determined by calculating the average of the offset differences determined in block 730. As another example, each model can be a vector of offsets and calculate a distance between the two based on the square root of the sum offset differences squared (e.g., $$\sqrt{\sum_N (\text{offset difference})^2}\,)$$

where N represents the number of slide position and color channel (or filter band) pairs and offset difference represents the offset determines calculated in block 730 for a particular slide position and color channel (or filter band) pair. In decision block 750, if the determined model difference value is greater than a predetermined threshold, then the component continues at block 755, else the component completes. In block 755, the model is updated by, for example, replacing the previously-generated model with the new model, taking an average (e.g., weighted average) of previously-calculated offsets for the date corresponding to the model, and so on.

FIGS. 8A-8E are images at various Z-slices or focal planes generated for a particular slide in some embodiments. The specimen in this example is stained with a Dual color ISH (in situ hybridization) method, and the goal is to detect and classify dots, which are indicators of a specific gene expression within tumor cells by chromogenic marking of the specific gene within the nucleus. In ISH, a labeled complementary DNA or RNA strand is used to localize a DNA/RNA sequence, which in turn acts as an indicator of chromosomal structure. It may be desirable to use a focus metric that considers the sharpness of the dots and is adapted to specimens and staining methods where dot detection is a relevant part of the image analysis. For this image data, the relevant structures in the image are the larger blue blobs and the small black and red dots. In some embodiments, a focus sharpness measure can be employed that is specialized for the specimen on the microscope slides and the staining method that was applied to the specimen before imaging. For this image data, the focus can be chosen to find the sharpest representation for the blue blobs, red dots, and black dots, and respective focus sharpness measures can be applied. A method for enhancing the contribution to the focus sharpness metric from somewhat round features (e.g., dot-like or disk-like shapes) in the image(s) is to base the computation of the metric on the response of a method referred to in image processing literature as using a radial symmetry operator or directional gradient concentration filter. Example methods to detect round dots of a known target size range are disclosed in Q. Yang, and B. Parvin, "Perceptual organization of radial symmetries," in Proceedings of. Computer Vision and Pattern Recognition, Volume 1, (2004); G. Loy and A. Zelinsky, "Fast radial symmetry for detecting points of interest," IEEE Transactions on Pattern Analysis and Machine Intelligence, Volume 25, Issue 8, pp. 959-973 (2003); and O. Schmitt and M. Hasse, "Radial symmetries based decomposition of cell clusters in binary and gray level images," Pattern Recognition, Volume 41, pp. 1905-1923 (2008). Once dots are identified, a focus sharpness measure can be computed from the sharpness of all individually identified dots. The image gradient over the dot boundary can be indicative of the sharpness of one dot. Methods to detect dots in an image typically require the choice of parameters, such as a minimum radius and a maximum radius, and can be adapted to different tissue types and staining methods of the specimen on the microscope slide. The focus sharpness metric can be based on the response of applying the filter once, or applying it a number of times with different parameters and combining the results. FIGS. 8A-8E illustrate how different Z-slices of a slide or images captured at different focal planes may have varying degrees of sharpness throughout the entire image and in specific regions. For example, blob 810 gets sharper from FIG. 8A to FIG. 8B and then to FIG. 8C but then loses sharpness in FIG. 8D and again in FIG. 8E. As another example, blob 820 gets sharper from FIG. 8A to FIG. 8B to FIG. 8C and to FIG. 8D but then loses sharpness in FIG. 8E. The techniques disclosed herein can be used to produce focused color image of FIG. 8C.

The imaging techniques disclosed herein can be used to produce highly-focused images of different types of samples. The samples can be breast tissue, such as that obtained during a needle biopsy, lumpectomy, or mastectomy. The samples can also be obtained from living multicellular vertebrate organisms, a category that includes human and non-human mammals, such as veterinary subjects. The disclosed techniques can be implemented different types of imaging systems that include, without limitation, a central processing unit, memory, input devices (e.g., keyboard and pointing devices), output devices (e.g., display devices), and memory and/or storage devices (e.g., disk drives). For example, the imaging apparatus 110 of FIG. 1 can include one or more processing units, memory, etc. The memory and storage devices can be computer-readable media that may be encoded with computer-executable instructions that implement the technology, e.g., a computer-readable medium that contains the instructions. The instructions can be stored and executed to perform a calibration process, scanning processes, recalibration process. In the calibration process, the instructions can be executed to determine a Z-offset from a best focus plane for channels that provide a best focus plane in each of the channels. The determinations can be stored in memory. In the scanning process, the instructions can be executed to determine a best focus plane for a field of view of the digital imager 111 of FIG. 1. The best focus plane information can be stored in memory 112 of FIG. 1. Instructions can be executed to command the imager 111 of FIG. 1 to obtain image data in its field of view in each of the channels in accordance with the Z-offsets determined in the calibration processes. In addition, the instructions, calibration information, data structures, and message structures may be transmitted via a data transmission medium, such as a signal on a communications link and may be encrypted. Accordingly, computer-readable media include computer-readable storage media 112 upon which data can be stored and computer-readable transmission media upon which data can be transmitted. The data can include, without limitation, auto-focus routines or techniques, calibration slide data (or other types of reference data), reference images, scanning techniques, calibration techniques, or the like.

Many embodiments of the technology described herein may take the form of computer-executable instructions, including routines executed by a programmable computer. For example, the analyzing system 100 of FIG. 1 can have computer-executable instructions for performing the calibration processes of FIGS. 3 and 4. The memory 112 of FIG. 1 can store the executable instructions. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers can be presented at any suitable display medium, including a CRT display or LCD. A user can view images and scores on such displays.

From the foregoing, it will be appreciated that specific embodiments of the technology have been described herein for purposes of illustration, but that various modifications may be made without deviating from the disclosure. The facility can include additional components or features, and/or different combinations of the components or features described herein. Moreover, while the techniques described above are generally described in the context of slide analysis, these techniques can be employed to enhance auto-focus techniques in different types of scanners, imagers, cameras, etc. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. The following examples describe additional embodiments of the technology disclosed herein.

The invention claimed is:

1. An imaging apparatus comprising:
a color digital imager for acquiring focused multi-spectral image data of a test specimen disposed on a microscope slide, wherein the test specimen has a first tissue type, wherein the imaging apparatus is configured to:
   (a) during calibration, determine a Z-offset from a base autofocus plane for color channels or filter bands of the color digital imager that provides a sharpest focus plane in each of the color channels or the filter bands, wherein the base autofocus plane is for a grey scale image, wherein the Z-offsets are obtained during calibration from one or more tissue-specific training slides having the same tissue type as the first tissue type;
   (b) while varying a microscope slide position, determine the base autofocus plane and the sharpest focal plane for a color channel or a filter band for a field of view of the color digital imager; and
   (c) obtain the multi-spectral image data in the field of view with the color digital imager of the test specimen having the first tissue type, wherein the multi-spectral image data is obtained for each of the color channels or the filter bands by determining optimal focal planes using (i) the determined Z-offsets, and (ii) the determined base autofocus plane in the field of view and the sharpest focus plane for the color channel or the filter band in the field of view;
   wherein the imager comprises a monochromatic or color sensor, and wherein an optical system of the imaging apparatus includes one or more different filters, and wherein the multi-spectral image data is generated by acquiring the multi-spectral image data with the one or more different filters.

2. The imaging apparatus of claim 1, wherein the Z-offsets rare derived for a plurality of slide positions for each slide in the one or more tissue-specific training slides.

3. The method of claim 1, wherein the imager comprises a monochromatic or color sensor, and wherein an optical system includes one or more different filters.

4. The method of claim 3, where the one or more different filters are tunable filters.

5. The method of claim 3, wherein multispectral or color image channels images are generated by acquiring multiple images from the imager with the one or more different filters.

6. A system comprising:
   (i) one or more processors, and (ii) one or more memories coupled to the one or more processors, the one or more memories to store computer-executable instructions that, when executed by the one or more processors, cause the system to perform operations comprising:
   (a) determining an offset from a first focus plane for each of red, green, and blue color channels or a filter bands, wherein the offset is derived by analyzing one or more tissue-specific training microscope slides, wherein each of the one or more tissue-specific training microscope slides includes a training specimen having a same tissue type;
   (b) determining, for a first test slide including a test specimen having the same tissue type as the training specimen of the one or more tissue-specific training specimens, a base focus plane for a field of view of the first slide; and
   (c) obtain-multi-spectral image data of the first test slide based on at least-on the determined base focus plane and the determined offsets for each of the red, green, and blue color channels or filter bands.

7. The system of claim 6, wherein the calibration component is configured to determine, for each of a plurality of filter bands, an offset from the first focus plane that provides a best focus plane for the filter band.

8. The system of claim 7, wherein the capture component is configured to retrieve, for each of the plurality of filter bands, the offset determined for the filter band.

9. The system of claim 8, wherein each obtained image is a previously-captured z-slice.

10. The system of claim 6, wherein the calibration component is configured to determine, for each of a plurality of color channels or filter bands, an offset from the first focus plane that provides a best focus plane for the color channel or the filter band.

11. The system of claim 6, further comprising (i) an imager including a monochromatic or color sensor; and (ii) an optical system including one or more different filters.

12. The system of claim 11, wherein the system further comprises computer-executable instructions for acquiring the multi-spectral image data with the one or more different filters.

13. An imaging apparatus comprising:
a color digital imager for acquiring focused multi-spectral image data of a test specimen disclosed on a microscope slide, wherein the test specimen has a first tissue type wherein the imaging apparatus is configured to:

(a) obtain a pre-computed focus model for the first tissue type, wherein the pre-computed focus model comprises one or more Z-offsets from a base autofocus plane for color channels or filter bands of the color digital imager that provide a sharpest focus plane in each of the color channels or the filter bands, wherein the base autofocus plane is for a grey scale image, and wherein the one or more Z-offsets are derived from one or more tissue-specific training slides having the same tissue type as the first tissue type;

(b) while varying a microscope slide position, determine the base autofocus plane and the sharpest focal plane for a color channel or a filter band for a field of view of the color digital imager; and (c) obtain the multi-spectral image data in the field of view with the color digital imager of the test specimen having the first tissue type, wherein the multi-spectral image data is obtained for each of the color channels or the filter bands by determining optimal focal planes using (i) the determined Z-offsets, and (ii) the determined base autofocus plane in the field of view and the sharpest focus plane for the color channel or the filter band in the field of view;

wherein the imager comprises a monochromatic or color sensor, and wherein an optical system of the imaging apparatus includes one or more different filters, and wherein the multi-spectral image data is generated by acquiring the multi-spectral image data with the one or more different filters.

14. The imaging apparatus of claim 1, wherein, during the calibration, the imaging apparatus is further configured to perform a Z-slice scan of a calibration slide.

* * * * *